(12) United States Patent
Graziani et al.

(10) Patent No.: US 8,572,050 B2
(45) Date of Patent: Oct. 29, 2013

(54) METHOD AND SYSTEM FOR REAL TIME SYSTEM LOG INTEGRITY PROTECTION

(75) Inventors: Valerio Graziani, Roma (IT); Attilio Mattiocco, Cassino (IT); Gaetano Ruggiero, Salerno (IT)

(73) Assignee: International Business Machines Corporation, Armonk, NY (US)

( * ) Notice: Subject to any disclaimer, the term of this patent is extended or adjusted under 35 U.S.C. 154(b) by 81 days.

(21) Appl. No.: 12/948,798

(22) Filed: Nov. 18, 2010

(65) Prior Publication Data
US 2011/0131188 A1 Jun. 2, 2011

(30) Foreign Application Priority Data
Dec. 1, 2009 (EP) .................................. 09177570

(51) Int. Cl.
*G06F 17/30* (2006.01)

(52) U.S. Cl.
USPC ............................................ 707/687; 726/23

(58) Field of Classification Search
USPC ................... 707/687; 719/318; 726/1, 22, 23
See application file for complete search history.

(56) References Cited

U.S. PATENT DOCUMENTS

| 7,437,763 B2 * | 10/2008 | Guo ................................ 726/25 |
| 2003/0236992 A1 * | 12/2003 | Yami ............................. 713/200 |
| 2005/0015767 A1 * | 1/2005 | Nash et al. ..................... 718/102 |
| 2008/0208924 A1 * | 8/2008 | Bradshaw et al. ............. 707/202 |
| 2009/0199296 A1 * | 8/2009 | Xie et al. ......................... 726/23 |

OTHER PUBLICATIONS

Hsu et al., "Back to the Future: A Framework for Automatic Malware Removal and System Repair", Proceedings of the 22nd Annual Computer Security Applications Conference (ACSAC'06), Copyright 2006, IEEE, 10 pages.

* cited by examiner

*Primary Examiner* — Monica Pyo
(74) *Attorney, Agent, or Firm* — Andrea Bauer; Hoffman Warnick LLC

(57) ABSTRACT

A method and system for managing integrity of system log file data. The system comprises a first component which, using a hook in a kernel of an operating system, allows interception of a write operation by a file system on at least one log file; then the first component detects a change in the security context in which the record is written in the log file. At each change detected, the first component adds information in the log file including the context information. The system further comprises a second component which reads the log file and, using the information added by the first component, detects if the change of context is due to a malicious writing operation in the log file for instance done by an unauthorized user or process.

12 Claims, 5 Drawing Sheets

METHOD AND SYSTEM FOR REAL TIME SYSTEM LOG INTEGRITY PROTECTION

FIELD OF THE INVENTION

The present invention generally relates to system log files. More particularly, the invention aims at watching log file security in real time to detect malicious modifications.

RELATED ART

Traditionally, log security is based on a strict list of resources that are authorized to access in write mode a set of logs, leaving open the possibility that a user with adequate permissions can remove, add, or alter part of the logged messages. A log management solution can ensure the log is stored remotely using a secure mechanism that ensures that the log is not altered after collection. However, there is no guarantee that the logged data has not been changed before the collection actually took place.

The Syslog (for system log) protocol defined by the RFC 5424 draft, describes how to transmit event messages and alerts across an IP network. Messages are sent by the operating system or application at the start or end of a process or to report the current status of a process. Used in conjunction with the Syslog protocol, the Syslog-sign technique defined as an IETF draft is a mechanism adding origin authentication, message integrity, replay resistance, message sequencing, and detection of missing messages to the transmitted Syslog messages. Essentially, this is accomplished by sending a special Syslog message. The content of this Syslog message is called a signature block. Each signature block contains, in effect, a detached signature on some number of previously sent messages. It is cryptographically signed and contains the hashes of previously sent Syslog messages. The originator of Syslog-sign messages is also simply referred to as "signer". The signer can be the same originator as the originator whose messages it signs, or it can be a separate originator. The sending device may transmit the modified Syslog messages to a "relay," which forwards the message to a "collector," which stores it. Using the Syslog-sign technique insures security of Syslog messages, but it poses several issues. For example, there is a drastic modification of the log format; with a solution like this one the log format would be modified with the inclusion of a secure hash on each logging line making it impossible to parse and analyze the log using the same solutions used on unsecured logs. Another drawback is that an application or process can bypass the logging application by requesting to the Syslog-sign API's to write a false/extraneous message in the log that would receive a valid hash and be considered as authentic. This may happen on the system alone or when transferring events. The vulnerability in Syslog-sign is due the fact that a process (as stated in Syslog-sign documentation) can impersonate a known process and be granted a valid signature.

Finally, it is noted that the Syslog-sign security is not efficient when a transfer of files occurs. Since the originator generating the signature block message signs each message in its entirety, the messages must not be changed in transit. By the same token, the Syslog-sign messages must not be changed in transit. However, when applying the relay behavior as described in RFC 5424 for transfer of System log messages, Syslog messages are altered. If such behavior were to occur in conjunction with Syslog-sign, it would render any signing invalid and hence make the mechanism useless. Likewise, any truncation of messages that occurs between sending and receiving renders the mechanism useless. This means that even using a log signing solution there is a period of time corresponding to transfer of System log messages during which a log is vulnerable to an alteration attack.

Consequently, the security brought by Syslog-sign protocol is not applicable to the traveling files and, when used on a single system, has drawbacks. There is thus still a need to overcome the drawbacks of the Syslog-sign solution when implementing security of files on a single system.

SUMMARY OF THE INVENTION

The present invention gives a user a reliable way to check if a log message created at the system level has been modified.

An aspect of the invention provides a method for managing system log file data integrity, the method comprising: at system boot time, defining a log file for which a hook in a kernel of an operating system allows interception of write operations by a file system to the log file; upon interception of a current write event to the log file: extracting from the log file to be written, a context of the write operation including a process or user identifier having created the log file record; comparing the context which was extracted in a previous interception of a write operation and, if the context has changed, writing additional information in the log file before allowing the write operation of the log file record to be written, the additional information advising of a change in the context of the log file of the current interception.

Another aspect of the invention provides a system for managing integrity of system log file data, the system comprising: a first component using a hook in a kernel of an operating system to intercept write operations of a file system on a log file, the first component being adapted, at each interception of the write operation, to analyze if a context of the log file record to be written has changed and to write additional information in the file advising of this change.

The present invention marks all Syslog messages with the security context, even if the activity was made by a malicious user. Contrary to the idea with Syslog-sign to give an insurance that all messages are trusted, the solution of the invention has a different approach: it does not enforce security, rather it allows a user to verify that the log is untampered. The solution is based on an innovative mechanism that secures log files and stores a set of security related information using the log file itself and a methodology that does not allow any tampering on the logs and does not require any changes on the log writing processes.

The system of the invention traces back any alteration identifying the process and user that made a change. The fact that blocks of messages are hashed makes it impossible to alter without altering the hash content. If a malicious process adds or alters a log it would get a different signature block that clearly defines who wrote it and using which process.

This solution definitely bypasses the issue of lack of reliability with the Syslog-sign prior art technique which allows a possible party to modify Syslog messages before log messages collection. Since with the solution of the invention at boot time the file system is hooked and all messages are traced to the process/user that made them one cannot modify it. As at boot time the file system is hooked, there is no need to rely on an external tool secured by an autonomous process.

Compared to Syslog-sign technique, the solution of the invention brings other advantages. For example, the log format is not impacted nor altered in its original content. Any log file record format including Syslog format is compatible with this format: the log record are not changed only additional information is added in the form of single rows which are skipped by the postprocessors for log file management. This allows the log to be postprocessed transparently by any existing log management solution.

The solution does not imply that the logging applications that want to leverage the proposed features have to build or link any new library. The applications will be able to secure their log files automatically and transparently, even if they do not explicitly leverage the Syslog technology/protocol.

The limitation due to impact on performance due to the number of packets that is mentioned in the Syslog sign prior art (see RFC 5424 chapter 6.1, "Message Length") is overcome by the proposed solution. "If a transport receiver receives a message with a length larger than it supports, the transport receiver SHOULD truncate the payload. Alternatively, it MAY discard the message." Syslog may still be used on the system and thus force truncation, but if the logging is performed independently of Syslog on a system that implements the solution of the invention there are no message limits in terms of string length. One single processing with the solution of the invention has a low impact on performance.

The proposed solution does not imply any constraint in terms of encryption key pair management, since it just uses a hashing mechanism (thus the consumer is not required to issue or purchase any security certificate).

DETAILED DESCRIPTION OF THE INVENTION

Figure 1:
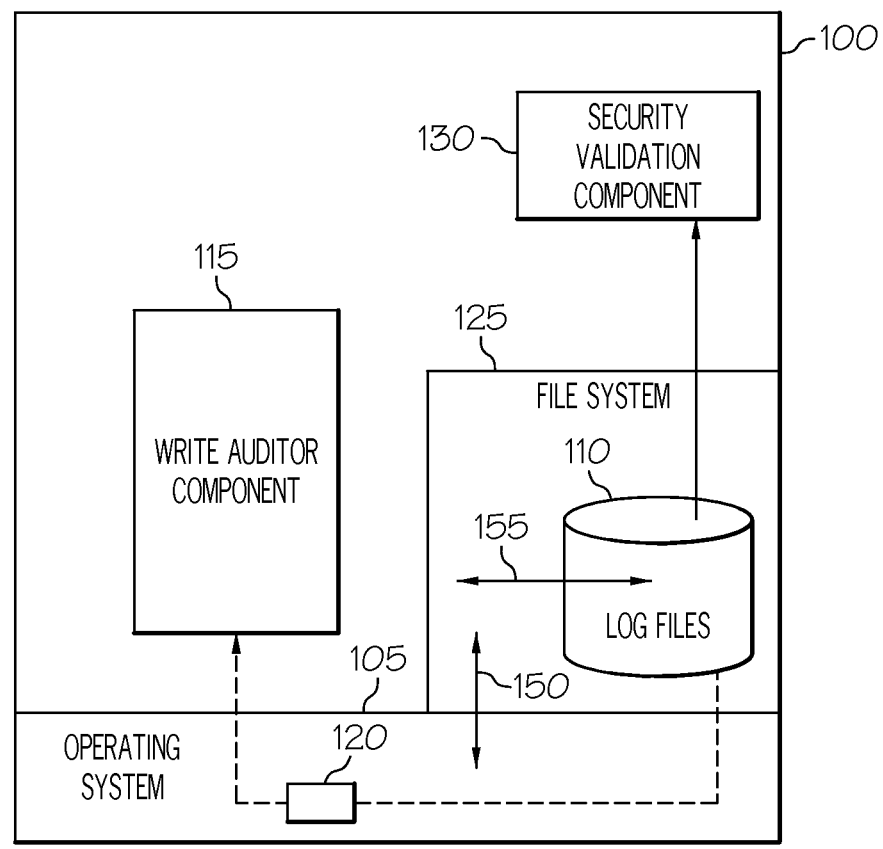
FIG. 1 shows a system environment of an embodiment of the invention.

FIG. 1 shows the system environment of an embodiment of the invention. The operating system (105) in a computer (100) logs system events in log files (110), which are system files. A file system (125) is triggered by the operating system (105) to log system events and performs read/write operations. The log files (110) may implement the Syslog protocol (RFC 5424) system logging format.

In this environment, the implementation of the embodiment comprises a decoupled component, the write auditor component (115), which is a subsystem that hooks (120) on the kernel of the operating system (105). To this extent, when the operating system (105) triggers (150) the file system (125) for a write operation (155) in the log files (110) monitored by the write auditor component (115), this operation is intercepted by the write auditor component (115). The technology that can be leveraged is slightly different on UNIX systems where one can use file system hooking and on Windows systems where one can use the Minifilter architecture. The write auditor component (115) includes a file access audit mechanism that keeps track of the processes that perform write operations on the log files (110). This information is embedded in the protected log files (110) by the write auditor component (115) itself, with information dependent on the events defined (e.g., change of PID, process, process file, buffer size, EOF, etc.).

The write auditor component (115) can be implemented as a software program having system privileges rather than a hardware logic; because of this privilege, the write auditor component (115) can be located on the system where the log files are created.

The write auditor component (115) is started at system boot time and remains active during the system log writing operations: the execution stops at shutdown time or each time there is a change between system log files. The administrator of the system chooses which system log file (110) will be protected by the write auditor component (115).

A second component, the security validation component (130), can be implemented as a software program that can be used to parse the enriched log files (110) and verify all the security meta information that has been embedded by the write auditor component (115) in the monitored log files (110). The security validation component (130) may be implemented on the same computer where the log files (110) are filled. If the security validation component (130) runs on a different computer than the one where the log files (110) have been created and intercepted by the write auditor component (115), this means that a copy of the log files (110) to be validated has been made. This is not a preferred embodiment as the user must ensure that the copy of the log file (110) has been obtained in a safe and secure way. The write auditor component (115) and security validation component (130) of the embodiment cannot guarantee that someone knowing the internal structure of the log file has not added some fallacious records in the copy of the log files. A person skilled in the art can add an additional file copy checking system as it exists today to the security validation component (130), however this is outside the scope of the present invention.

It is noted that the log files (110) may be formatted using the Syslog (RFC 5424) protocol, the security meta information embedded in a log file (110) being independent are thus compatible with the log record format. In the case where the log files (110) created and enriched by the write auditor component (115) are sent through an IP Network while implementing the Syslog relay protocol of the RFC 5424, the messages in the initial log files are modified. These modifications are not seen by the security validation component (130) validating a traveling log file because it only identifies and delimits the information added in the log files with the security context (as described in more detail in relation with the description of FIG. 4) by the write auditor component (115).

Figure 2:
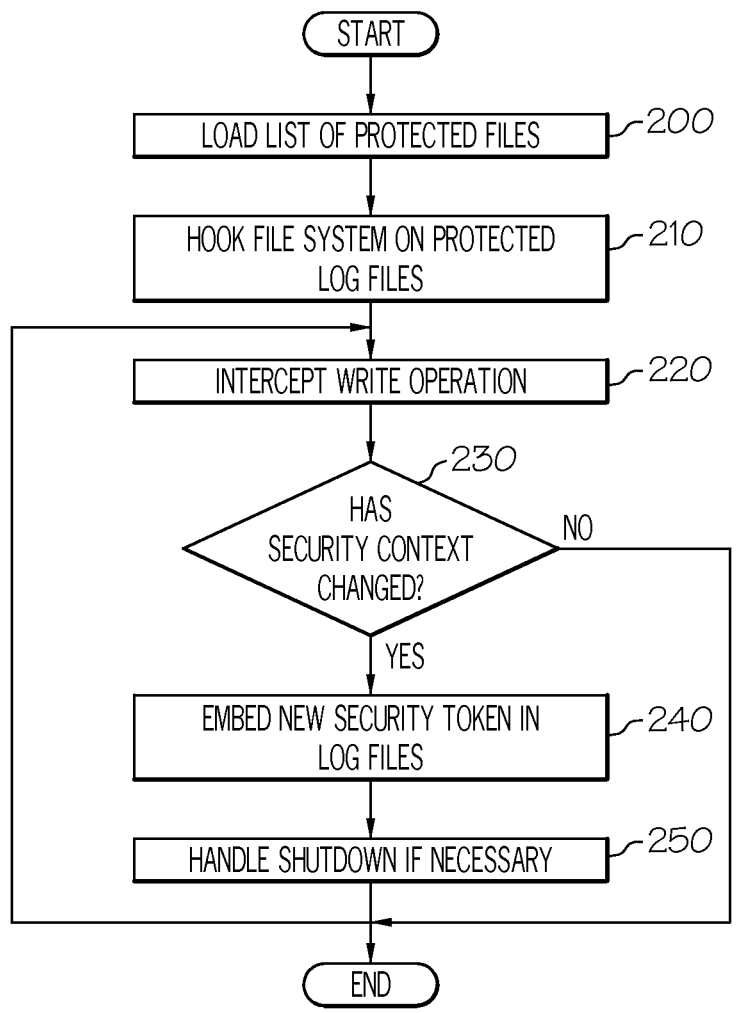
FIG. 2 is a first part of a general flowchart of the invention for creating enriched log files according to an embodiment.

FIG. 2 is a first part of a general flowchart of the invention for creating enriched log files (110) according to an embodiment. In the embodiment, the system administrator defines the list of the log file systems to be monitored by the write auditor component (115). The process starts at system boot time: the write auditor component loads (200) the list of log files that will be monitored. The write auditor component hooks (210) the file system in the kernel to allow that all writing activities that are performed by the file system on the log files be intercepted by the write auditor component before the write is performed. The technology which is used to hook the file system on UNIX is a "filesystem hook", on Windows the technology used is the "filesystem minifilter hook". The write auditor component initializes the log file with a first security token and delimits a first section in the log file by writing a second security token. The second security token may include among other fields a hash that secures checksums produced using a valid hashing methodology, like for example MD5 as described in RFC 1321.

The write auditor components intercepts (220) the first write operation, and extracts and stores the current security context (the security context is a complete set of information that uniquely identifies a "security user" by a process name or a process Id or user name that writes in a log file). At every further write operation on the log file the log record is monitored by the write auditor component and compared (230) to the current security context; if the security context has not changed (answer No to test 230) a next write operation is intercepted (220). If the security context has changed (answer Yes to test 230) a closing security token is written and a new opening security token is written on the log file before any operation takes place (240). This ensures that each section is marked by an opening and closing security token that clearly delimits every log section where the security context has not changed from what is indicated in the security token. The process continues until an eventual shutdown or log rotation event that would be marked as yet another security context change; the last write operation on the log file is a security token that closes the log indicating that a shutdown event is occurring (250) with all relevant security info.

This flow is activated every time a monitored Log file changes.

With the write auditor component, the system log files which have been designated by the administrator of the system are always under protection as significant information are logged. The component does not prevent malicious writing in the system log files but collects and point out significant information (the security context information) which will help retrieving in a past processing phase the malicious writing operation performed by unauthorized users or processes.

Figure 3:
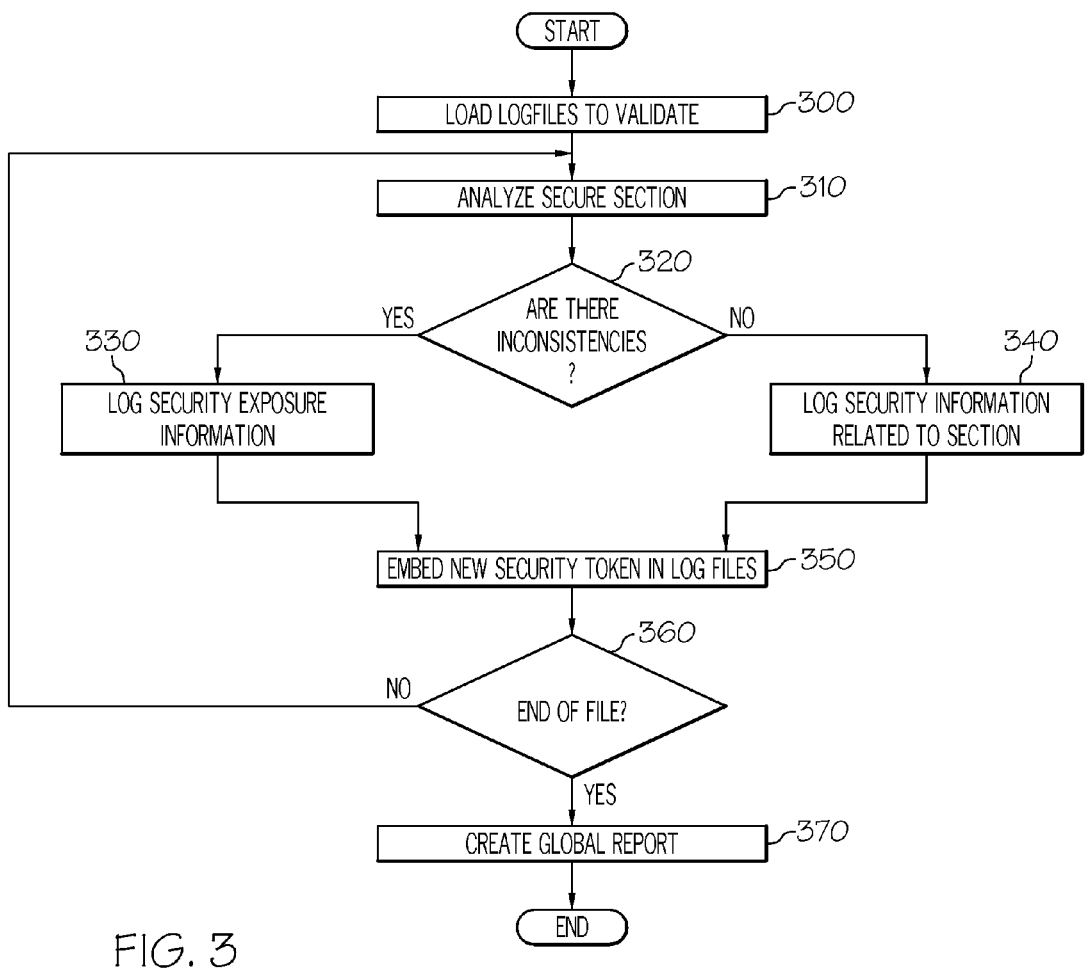
FIG. 3 is the second part of the general flowchart of the invention for validating enriched log file records according to an embodiment.

FIG. 3 is the second part of the general flowchart of the invention for validating the enriched log file records according to an embodiment. The security validation component is a subsystem analyzing the content of the log files which have been enriched by the write auditor component. The security validation component parses the log file and verifies all the security meta information that has been embedded by the write auditor component. The security validation subsystem is used to verify that the protected log files have not been tampered with or altered in any way as explained in more details in relation with the description of FIG. 5.

The flowchart of FIG. 3 is executed for every file that has to be validated. The security validation subsystem loads (300) a file requiring validation, identifies a secured section (310) delimited by an opening and a closing token, extracts the security token and compares the secured section with the information stored in the security token. The next step is checking if an inconsistency is found in the token which are analyzed. An inconsistency is found (answer Yes to test 320) when by checking the time, it is noted that the log file has been tampered with after creation; one other inconsistency is when the user or the process having created some log file records is unauthorized. The log security exposure information is extracted by the security validation component and a security exposure event is generated (330). If no inconsistency is found (answer No to test 320), then the security context is extracted and the information on the section is logged (350) (Information on the process activities, PIDs, files and users) in a readable format indicating the relevant line numbers. The process continues for all secured sections (answer No to test 360) until EOF (answer Yes to test 360) and the file global security report is completed (370).

Figure 4:
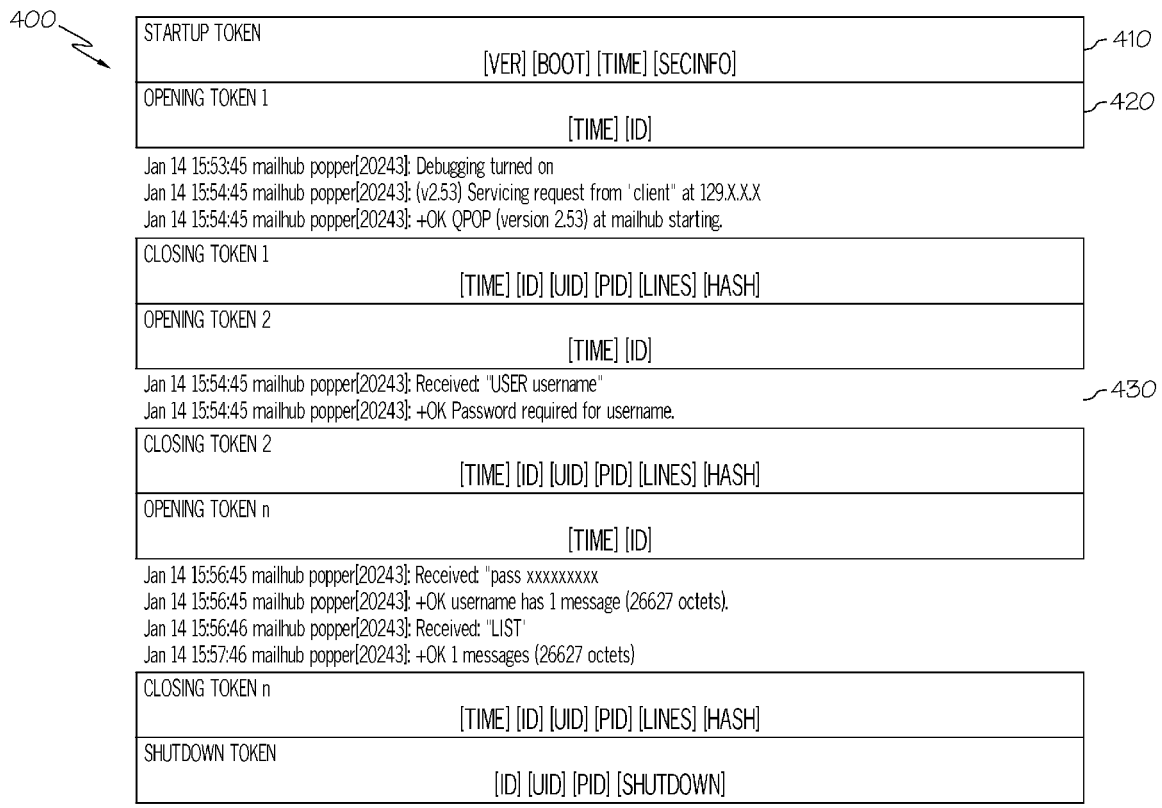
FIG. 4 is an example of a log file entry which has been enriched according an embodiment.

FIG. 4 is an example of log file entry which has been enriched according to the method of an embodiment. A first token (410) has been entered when a first write operation is detected on a new log file to be monitored. The first section is also opened with an opening token (420) when the first context of the first write operation is stored for further comparison. In an embodiment, in all security tokens (opening, closing, startup and shutdown) the fields are provided in the order listed. Each field occurs once and only once in the token, delimited in a defined way. The tokens may contain the following fields, abbreviated with the following acronyms:

| | |
|---|---|
| Version | VER |
| System Boot time | BOOT |
| Time | TIME |
| Write Auditor security information | SECINFO |
| Token ID | ID |
| User ID | UID |
| Process ID | PID |
| Log Lines (number of CR) | LINES |
| Log Hash | HASH |
| Shutdown Time | SHUTDOWN |

The Startup Token Contains:

| |
|---|
| Version |
| System boot time |
| Time |
| Write Auditor security information (PID, UID) |

The startup token includes the version of the write auditor subsystem to accommodate changes in the writing format (this is useful if the tokens change from one version to another), time that marks the file creation time, and write auditor security information, which includes the process Ids and User Ids that are currently running the auditor process.

The Opening Token Contains:

| |
|---|
| Token ID |
| Time |

The open token includes a unique ID generated by the write auditor and the timestamp of when the token was written.

The Closing Token Contains:

| |
|---|
| Token ID |
| time |
| UID |
| PID |
| Lines |
| Log Hash |

The close token includes the same unique ID used in the corresponding open token generated by the write auditor, the timestamp of when the token was written, user ID of the user that owned the security context, process ID of the process that owned the security context, number of lines of log above it, and a hash of all the messages included in the open token and the closed token.

The Shutdown Token Contains:

| |
|---|
| Token ID |
| Shutdown Time |
| UID |
| PID |

The shutdown token includes a unique ID generated by the write auditor and the timestamp of when the shutdown process was performed, it also includes the user ID and process ID that initiated the shutdown.

If a user appends extraneous messages in the log (130) the closing token 2 indicates different security info; different PID, UID, etc.

Figure 5:
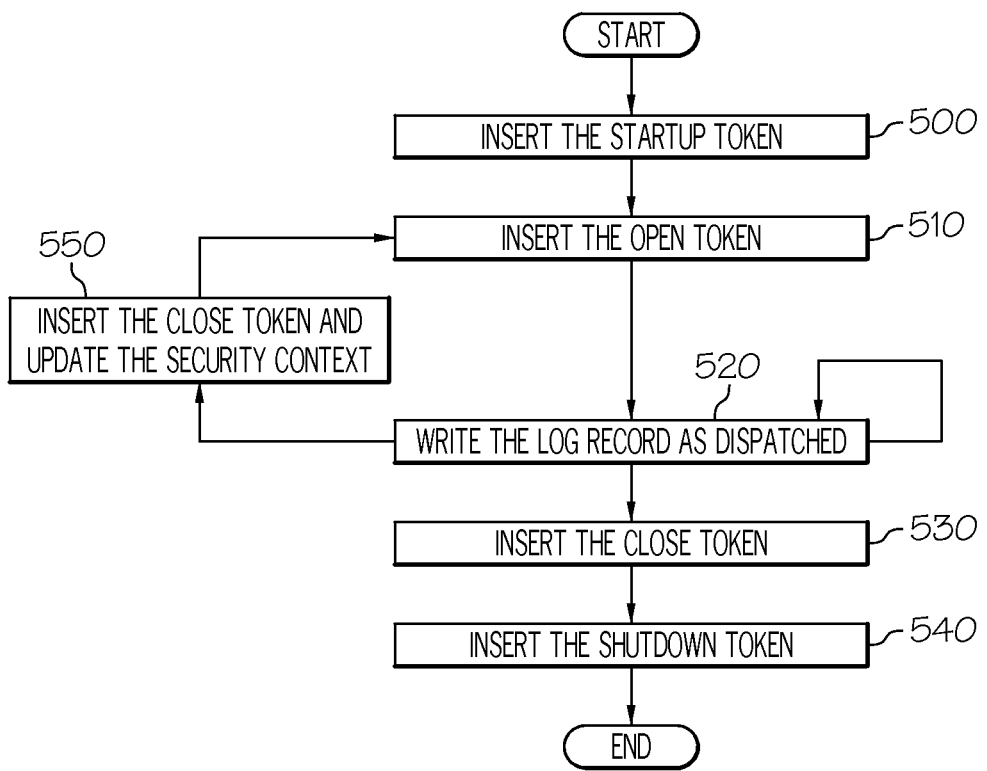
FIG. 5 is a token writing state chart machine according to an embodiment.

FIG. 5 is a token writing state chart machine according to an embodiment. This figure shows the logic used when a write event is intercepted and how the tokens are written. The process starts as stated before at system boot when log files protection are identified by the system. The write auditor component writes the startup token (500) for initializing the log file monitoring and includes the first open token (510) to start the first section. When a write event is intercepted, the write auditor component either allows log record writing or, if the security context has changed, closes the current section by writing a close token (550) noting the security context of the just closed section and opens a new section in the log file by writing a new open token (510) and waiting for the new log file writing interception (520). When a shutdown event is received, the write auditor components closes the current section by writing a close token (530) and writing a shutdown token (540) before the log file is closed by the system and the process ends. The process is exactly the same if the log rotates to a new one; a close token (530) marks the last file write operation and an open token (510) marks the beginning of the new log file.

There are different types of alteration of the system log files that could occur and which are identified with the security tokens as described. A first case is when a user or process alters the file adding content at the end of the log file while it is monitored on the file system; in this case, the security context change would be marked with an open token (510) and a close token (550) that show that the user or process writing was different. A second case is a user that edits the log file to insert or alter existing log lines in it; in this case, when the file is open for editing the write auditor intercepts the file system operation and when the user saves the altered log file, what would be saved is the old log file. This saving will be done before the editing starts with a new open token (510) and a close token (550) that completely delimit the saved log file marked as a change of security context on the whole portion edited; this marked change allows identification of all the sections that have been altered by comparison with the log entries in the open (510) and close (550) section above it. It also allows verifying which processes/users have written in the log file or edited it. A last alteration that might occur is that the log file is altered out of the secured file system, in this case the security validation component would identify the altered sections because of inconsistencies in the hashes in the close token (550).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including Instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The invention claimed is:

1. A method for managing integrity of system log file data, the method comprising:
   at system boot time, defining one or more log files;
   intercepting, using a hook in a kernel of an operating system, write operations by a file system to the at least one log file;
   upon each interception of a write operation to a respective one of the log files by the hook in the kernel of the operating system:
      extracting from a record of the log file to be written to by the write operation, a context of the write operation, the context including a process that created the log file or an identifier of a user that created the log file record; and
      comparing the context extracted in a current interception with the context extracted in a previous interception and stored in an opening token in the log file and, when the context has changed from the previous interception to the current interception, writing additional information in a closing token in the log file before allowing the write operation of the log file record to be written, the additional information in the closing token advising of a change in the context of the log file of the current interception;
   reading in the respective log file the additional information in the closing token advising of a change in the context of the log file of a writing interception and reading at least one log file record preceding the additional information to determine when it was a malicious writing; and,
   creating an output pointing out the malicious writing operations in the log file.

2. The method of claim 1, further comprising, upon detection of a system shutdown or an end of log file, writing additional information in a shutdown token in the log file advising of a change in the context of the log file of the current interception.

3. The method of claim 1, wherein the step of writing additional information in the closing token comprises writing additional information including a time of the interception and a user or a process which is responsible for the writing in the log file.

4. The method of claim 1, wherein the malicious writing is when a user or a process is not authorized to write a log record.

5. A non-transitory computer readable storage medium storing a computer program product comprising programming code instructions for executing a method for managing integrity of system log file data when the program is executed on a computer, the method comprising:
   at system boot time, defining one or more log files;
   intercepting, using a hook in a kernel of an operating system write operations by a file system to the at least one log file;
   upon each interception of a write operation by the hook in the kernel of the operating system to a respective one of the log files:
      extracting from a record of the log file to be written to by the write operation, a context of the write operation, the context including a process that created the log file or an identifier of a user that created the log file record; and
      comparing the context extracted in a current interception with the context extracted in a previous interception and stored in an opening token in the log file and, when the context has changed from the previous interception to the current interception, writing additional information in a closing token in the log file before allowing the write operation of the log file record to be written, the additional information in the closing token advising of a change in the context of the log file of the current interception;
   reading in the respective log file the additional information in the closing token advising of a change in the context of the log file of a writing interception and reading at least one log file record preceding the additional information to determine when it was a malicious writing; and,
   creating an output pointing out the malicious writing operations in the log file.

6. The non-transitory computer readable storage medium of claim 5, the method further comprising, upon detection of a system shutdown or an end of log file, writing additional information in a shutdown token in the log file advising of a change in the context of the log file of the current interception.

7. The non-transitory computer readable storage medium of claim 5, wherein the step of writing additional information in the closing token comprises writing additional information including a time of the interception and a user or a process which is responsible for the writing in the log file.

8. The non-transitory computer readable storage medium of claim 5, wherein the malicious writing is when a user or a process is not authorized to write a log record.

9. A system for managing integrity of system log file data, the system comprising:
   a computer device, including:
   a first component for intercepting, using a hook in a kernel of an operating system, write operations of a file system on at least one log file, the first component being adapted, at each interception of the write operation by the hook in the kernel of the operating system to a respective one of the log files, to:
      extract from a record of the log file to be written to by the write operation, a context of the write operation, the context including a process that created the log file or an identifier of a user that created the log file record; and
      compare the context extracted in a current interception with the context extracted in a previous interception and stored in an opening token in the log file and, when the context has changed from the previous interception to the current interception, write additional information in a closing token in the log file before allowing the write operation of the log file record to be written, the additional information in the closing token advising of a change in the context of the log file of the current interception; and
   a second component for:
      reading in the respective log file the additional information in the closing token advising of a change in the context of the log file of a writing interception and reading at least one log file record preceding the additional information to determine when it was a malicious writing; and,
      creating an output pointing out the malicious writing operations in the log file.

10. The system of claim 9, further comprising a component for writing additional information in a shutdown token in the log file advising of a change in the context of the log file of the current interception, upon detection of a system shutdown or an end of log file.

11. The system of claim 9, wherein the writing additional information in the closing token comprises writing additional information including a time of the interception and a user or a process which is responsible for the writing in the log file.

12. The system of claim 9, wherein the malicious writing is when a user or a process is not authorized to write a log record.

\* \* \* \* \*